Figure 1:
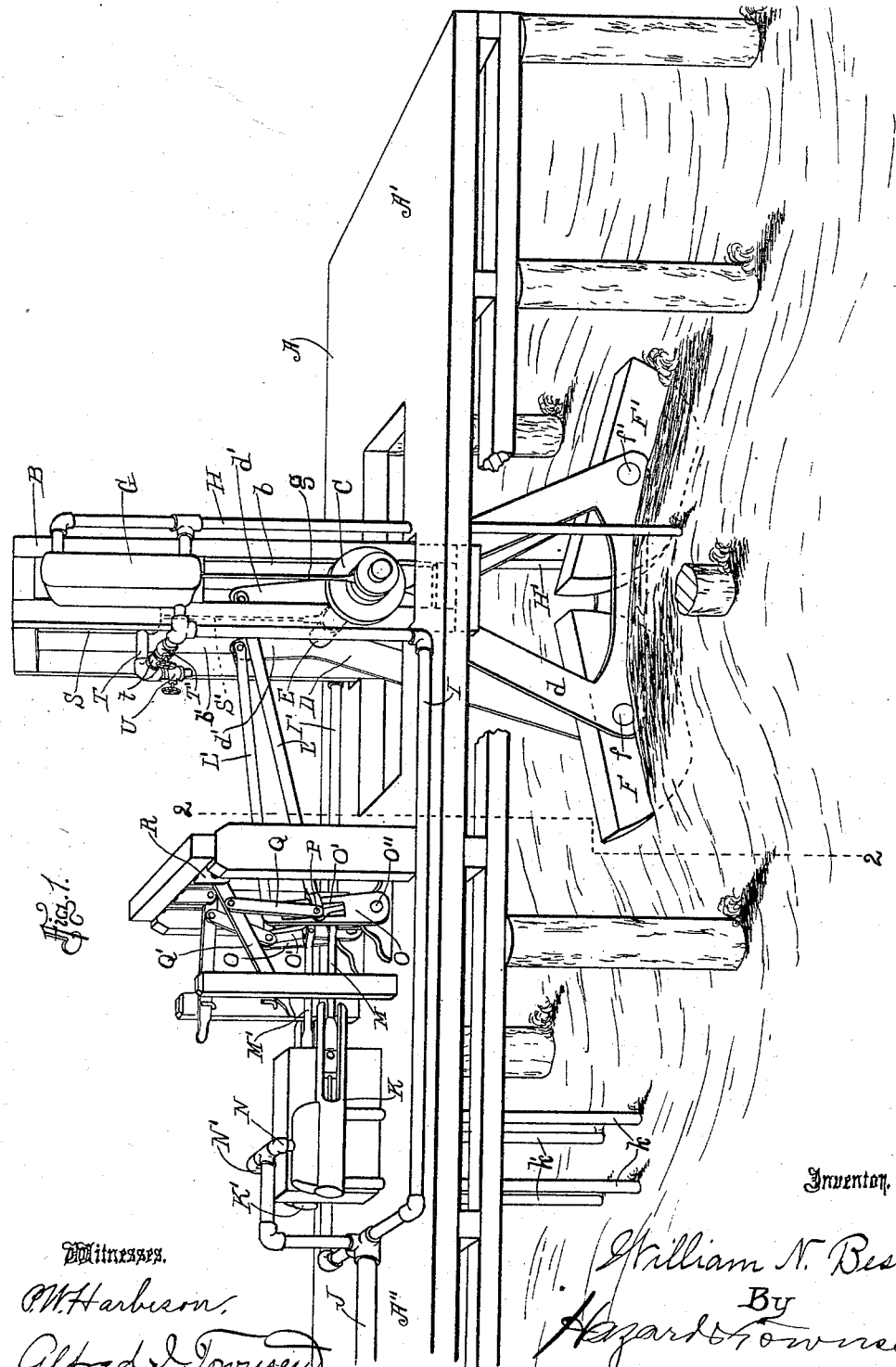

(No Model.)
2 Sheets—Sheet 1.

W. N. BEST.
WAVE MOTOR.

No. 537,559.
Patented Apr. 16, 1895.

Witnesses.
P. W. Harbison.
Alfred I. Townsend.

Inventor.
William N. Best,
By
Hazard & Townsend
His Attys.

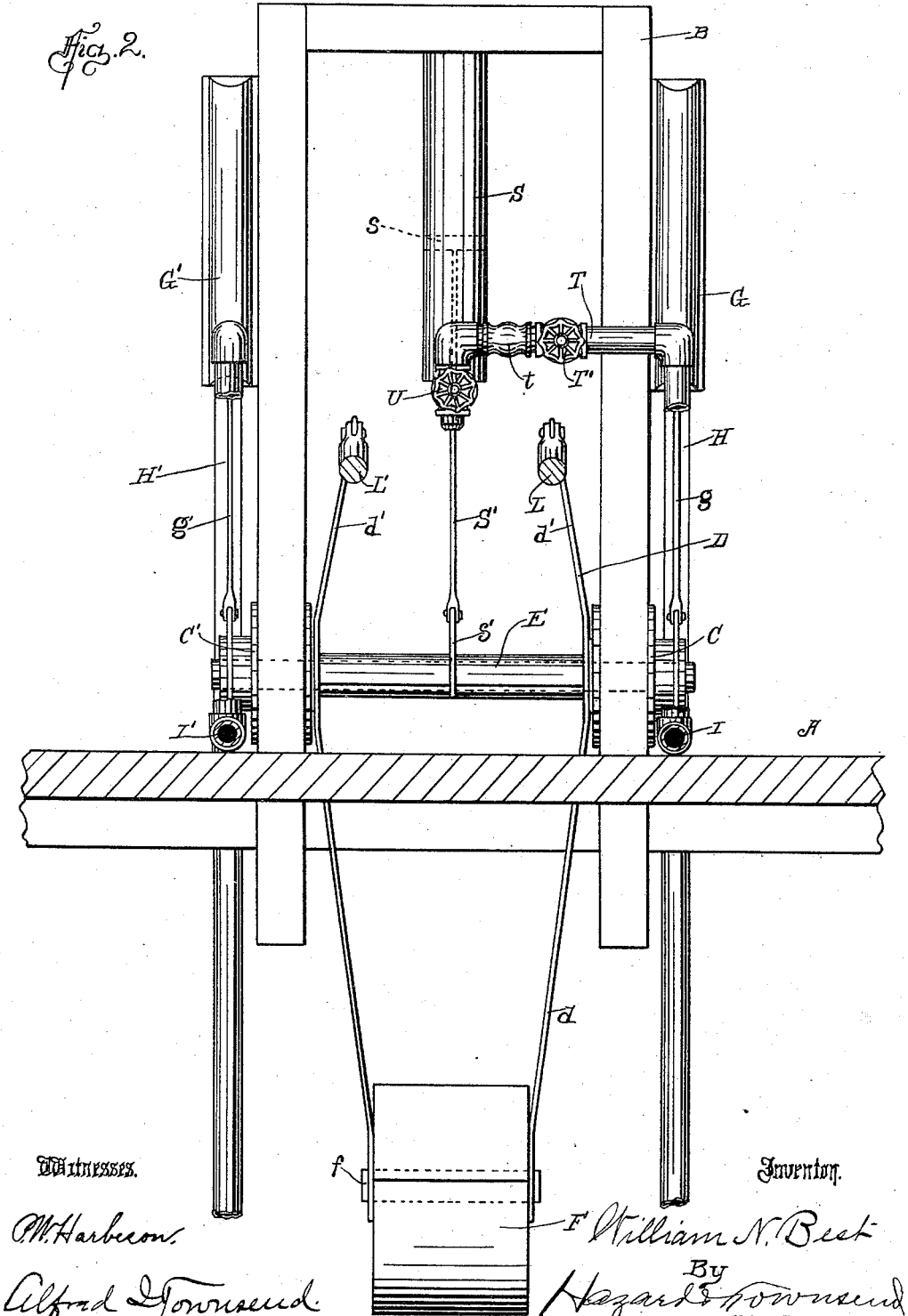

UNITED STATES PATENT OFFICE.

WILLIAM NEWTON BEST, OF REDONDO, CALIFORNIA.

WAVE-MOTOR.

SPECIFICATION forming part of Letters Patent No. 537,559, dated April 16, 1895.

Application filed July 13, 1894. Serial No. 517,392. (No model.)

*To all whom it may concern:*

Be it known that I, WILLIAM NEWTON BEST, a citizen of the United States, residing at Redondo, in the county of Los Angeles and State of California, have invented new and useful Improvements in Wave-Motors, of which the following is a specification.

The object of my invention is to produce a motor which will utilize the rise and fall of the waves and will also utilize the ebb and flow thereof.

A further object of my invention is to provide a wave motor which will be provided with conveniently operated and automatic means whereby the floats may be held elevated near the crest of the waves during time of storm, thus to avoid breakage from the beating of the waves, which has heretofore proved so disastrous to motors of this class.

The accompanying drawings illustrate my invention.

Figure 1 is a perspective view of a wave motor constructed according to my invention. Fig. 2 is a sectional view on line indicated by 2—2 Fig. 1 looking toward the right.

The most effective results in developing power from the waves can be derived from the rise and fall of the swell operating upon a float arranged at a point as near as possible to the point at which the waves comb before breaking upon the shore. In order to secure the best results I design to arrange my motor on a pier A, which extends from the shore (not shown) out to the point at which the waves begin to comb when the tide turns to come in. In Fig. 1 the end A' of the pier is the seaward end, and the end A'' is the landward end. Upon this pier A, I arrange a suitable supporting frame B, which is provided with vertical guideways $b\ b'$, in which are arranged sliding boxes C C'. To these boxes C C' is pivoted a power frame D by means of a shaft E which extends across the frame and has its ends journaled in the boxes C C'.

To the lower end $d$ of the power frame D are secured the floats F F', which are arranged one in front of the other and in a horizontal position and are each pivoted to the frame D by a pivot $f(f')$ arranged near the mid-length of the float, so that each float is free to respond to the action of the waves. This avoids the strain which is caused by the action of the waves beating against a body which is unyieldingly fixed to a support.

By pivoting the frame D in the vertically sliding boxes C C' the frame is made free to oscillate back and forth, and also to reciprocate vertically. I arrange suitable means of connection with the float whereby I am enabled to utilize both the oscillating and the reciprocating motion of the waves. These means I will now describe.

Upon the supporting frame B, I arrange suitable pump cylinders G G', which are each provided with a suitable intake pipe H (H') arranged extending through the wharf, and into the water therebelow. These pump cylinders communicate through means of educt pipes I and I' with a main J which extends to a reservoir (not shown) in which the water pumped by the operation of the motor is designed to be stored.

The piston rods $g$ and $g'$ of the pumps G and G' are connected with the shaft E, and as the floats F and F' are raised by the action of the waves, the frame D is forced upward, thereby carrying the shaft E upward, the boxes C and C' sliding in the guideways $b$ and $b'$, and the piston rods $g$ and $g'$ are thus operated to cause the pumps to pump water from the ocean into the main J. When the wave has passed the floats, the weight of the floats and of the frame D will draw the pistons down, thus to operate the pumps by the downward movement of the floats.

In order to utilize the oscillating movement of the waves, I arrange two pumps K and K', preferably in a horizontal position as shown in Fig. 1, and to the upper end $d'$ of the frame D which extends above the shaft E, I attach pitman rods L and L' which are connected with the piston rods M and M' of the pumps K and K' so that as the oscillatory movements of the waves carry the floats F F' and frame D back and forth, the movement will operate the pumps K and K' and cause them to draw water through the intake pipes $k$ and $k'$, and discharge it through the educt pipes N and N' into the main J.

Sometimes the swell is more violent than usual, and for this reason it becomes advisable to provide suitable means for changing the stroke of the pumps K and K'. The means I have shown for accomplishing this consists of the rock lever O, which is pivoted to the wharf at one end, and has its upper end provided with a longitudinal slot O' in which the end of the pitman rod L (L') is pivoted by means of a journal pivot P, which is arranged to slide back and forth in the slot. To the pitman I secure a suitable link Q, which is pivoted at one end to an actuating lever Q', which is pivoted to a frame R at one end and has its other end supported by a rack R' and arranged to be adjusted vertically to thereby operate the link Q to slide the pivot P in the slot O'. The piston rod M (M') of the pump K (K') is pivoted to the rock lever O at a suitable distance from the pivotal point O'' of the rock lever and its distance from the pivot O'' is always the same, so that by shifting the end of the pitman rod by sliding the pivot P back and forth in the slot O' to change its position relative to the pivotal point O'' of the lever, the length of stroke of the pump will be changed to suit the operator.

In order to provide suitable means whereby the float may be suspended at its limit of upward movement, under the action of the waves, when it is desirable, as, for instance, when a storm is coming on, and the waves would beat so heavily on the floats as to strain the motor, I provide a hydraulic cylinder S which is secured to the frame B and is provided with a suitable piston rod S' which is pivoted to a link s' which is journaled upon the shaft E at its mid-length.

A suitable inlet T is provided to admit water into the lower portion of the cylinder and beneath the piston head s. This inlet pipe T, as shown, communicates with the educt pipe (I) of one of the pumps (G) and is provided with a globe valve T' which is ordinarily closed, and with a check valve t arranged to prevent back flow of the water from the piston cylinder S.

A suitable globe valve U is provided for opening communication between the piston chamber and the outer air, in order to allow the piston to move freely up and down in the cylinder S when the motor is in operation. When it is desired to raise the floats from the water, the globe valve U is closed and the globe valve T' is opened to admit water beneath the piston head s of the piston S, and as the frame D is raised by the waves raising the floats F F' the water is forced or drawn into the piston S and the check valve t prevents its return, so that when the wave recedes, the floats are suspended by the water cushion thus provided in the cylinder S. If the next wave is higher than the one preceding, it operate to raise the floats, frame and piston head still higher, and the water again flows in beneath the piston head, and is retained in the chamber and supports the floats a still greater distance above the mean level of the water. By providing a check valve to prevent back flow of the water the action of the hydraulic cylinder is automatic, and always operates to suspend the floats at the highest point to which they are elevated by the waves, so that the succeeding wave will have little force upon the floats. When the floats are thus suspended the rising and falling movement of the waves will not be utilized for pumping, but the oscillatory movement will be utilized by means of the pumps K and K'.

If it should be desired, the cylinder S may be arranged to operate as a pump when it is not necessary to use it as a hydraulic support, but such means of arrangement will suggest themselves to any one versed in the art, and does not require illustration or description herein. For the same reason detailed illustration of the hydraulic cylinder, the check valve and the pumps is not given herein.

It is my intention to pump water from the ocean, and to store it in an elevated reservoir from which it may be conveyed under pressure and used to operate water wheels or other suitable means of converting power, and to operate with the power thus produced, dynamos, the electrical power from which may be conveyed long distances by means of comparatively inexpensive wires.

The frame D is so arranged in the support B that the floats F F' cannot strike against the pier or other obstruction while the motor is in operation.

Now, having described my invention, what I claim as new, and desire to secure by Letters Patent, is—

1. A wave motor comprising a float: suitable means for communicating power from the float: a cylinder provided with a piston: an inlet pipe arranged to supply water to the cylinder: suitable means for preventing the escape of water from the cylinder, and suitable means connecting the cylinder with the float.

2. A wave motor comprising a support: a frame arranged to be reciprocated vertically upon such support: a float pivotally secured to the lower end of such frame: a cylinder secured to the support: a piston arranged in such cylinder: an inlet pipe opening into one end of the cylinder and communicating with a source of water supply, and suitable means connecting the frame with the piston, whereby the frame and the float may be suspended by the piston.

3. A wave motor comprising a frame support: a frame arranged in such support, pivoted to oscillate and arranged to reciprocate: a float secured to one end of the frame: a pump arranged to be operated by the oscillating motion of the float: a pump arranged to be operated by the reciprocating motion of the float: a cylinder attached to the frame support: a piston arranged in such cylinder:

suitable means connecting the piston with the float, and suitable means connecting the cylinder with a source of water supply whereby the piston will operate to support the float when desired.

4. A wave motor comprising a vertically arranged frame pivoted to oscillate and provided at its lower end with a horizontally arranged float pivoted near its mid-length to the frame, and suitable means connected with the frame and arranged to communicate power from the movement of the frame.

5. A wave motor comprising a vertically arranged frame pivoted to oscillate, and provided at its lower end with two floats arranged one in advance of the other and each pivoted near its mid-length to the frame, and suitable means connected with the frame and adapted to communicate power from the movement of the frame.

6. A wave motor comprising a support provided with vertical guides: a frame pivoted in suitable guide blocks: such guide blocks arranged to slide in such guides: a pump arranged to be operated by the reciprocation of the frame: a pump arranged to be operated by the oscillation of the frame: a float secured to the lower end of the frame: a hydraulic support connected with the frame, and communicating with a source of water supply and arranged to suspend the frame and floats when desired.

WILLIAM NEWTON BEST.

Witnesses:
R. T. YOUNG,
W. H. HARRISON.